United States Patent [19]

Willis

[11] Patent Number: 4,761,686

[45] Date of Patent: Aug. 2, 1988

[54] TV RECEIVER HAVING FREEZE FIELD DISPLAY

[75] Inventor: Donald H. Willis, Indianapolis, Ind.

[73] Assignee: RCA Licensing Corporation, Princeton, N.J.

[21] Appl. No.: 928,948

[22] Filed: Nov. 6, 1986

[51] Int. Cl.$^4$ ............................................. H04N 5/14
[52] U.S. Cl. .................................... 358/160; 358/140
[58] Field of Search .............................. 360/10.1, 11.1; 358/140, 312, 22, 183, 160

[56] References Cited

U.S. PATENT DOCUMENTS 4,298,896 11/1981 Heitmann ........................... 360/11.1
4,636,857 1/1987 Achiha et al. ...................... 358/140
4,679,084 7/1987 Topper et al. ...................... 358/160

Primary Examiner—James J. Groody
Assistant Examiner—David E. Harvey
Attorney, Agent, or Firm—Paul J. Rasmussen; Eric P. Herrmann; Kenneth N. Nigon

[57] ABSTRACT

An interpolating apparatus for generating a pair of non-identical, interlaced fields from a single stored field of video signal. One of the interlaced fields is generated by adding three-fourths of one line's amplitude to one-fourth of the next line's amplitude. The other interlaced field is generated by adding one-fourth of said one line's amplitude to three-fourths of the next line's amplitude.

9 Claims, 3 Drawing Sheets

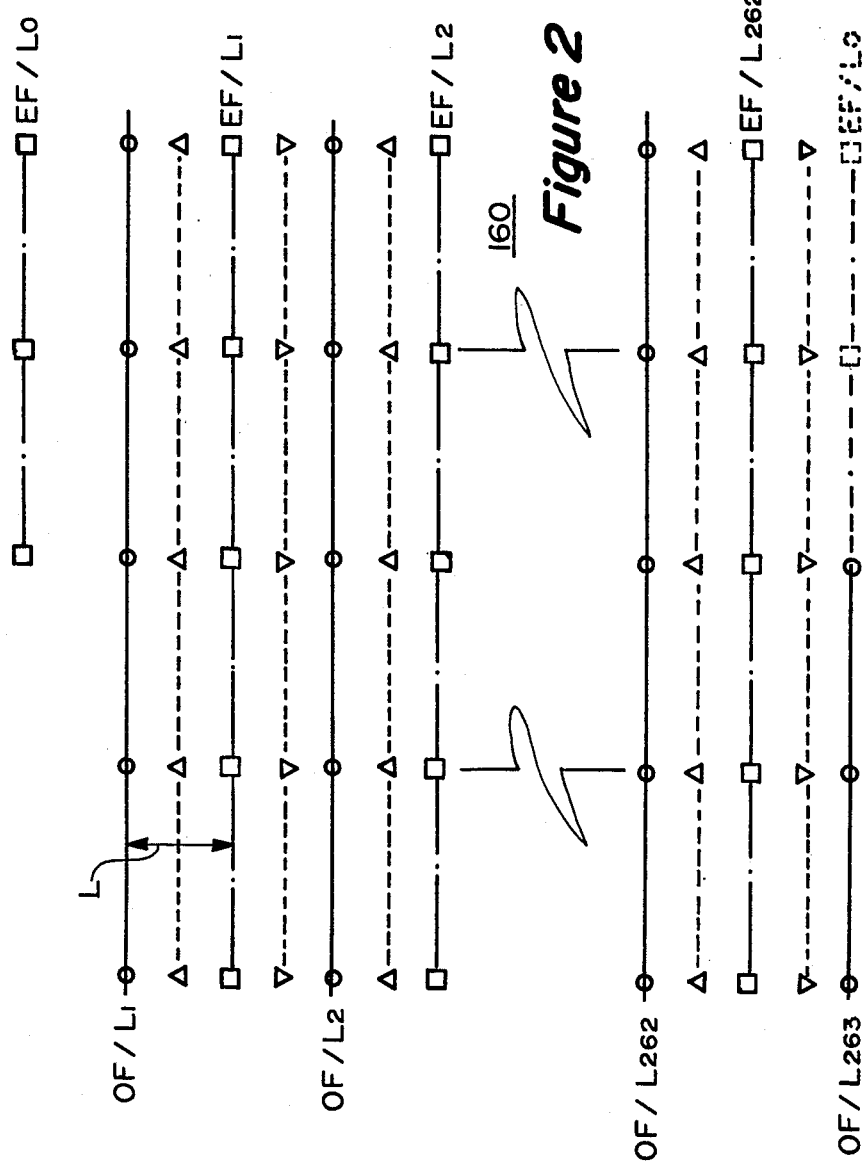

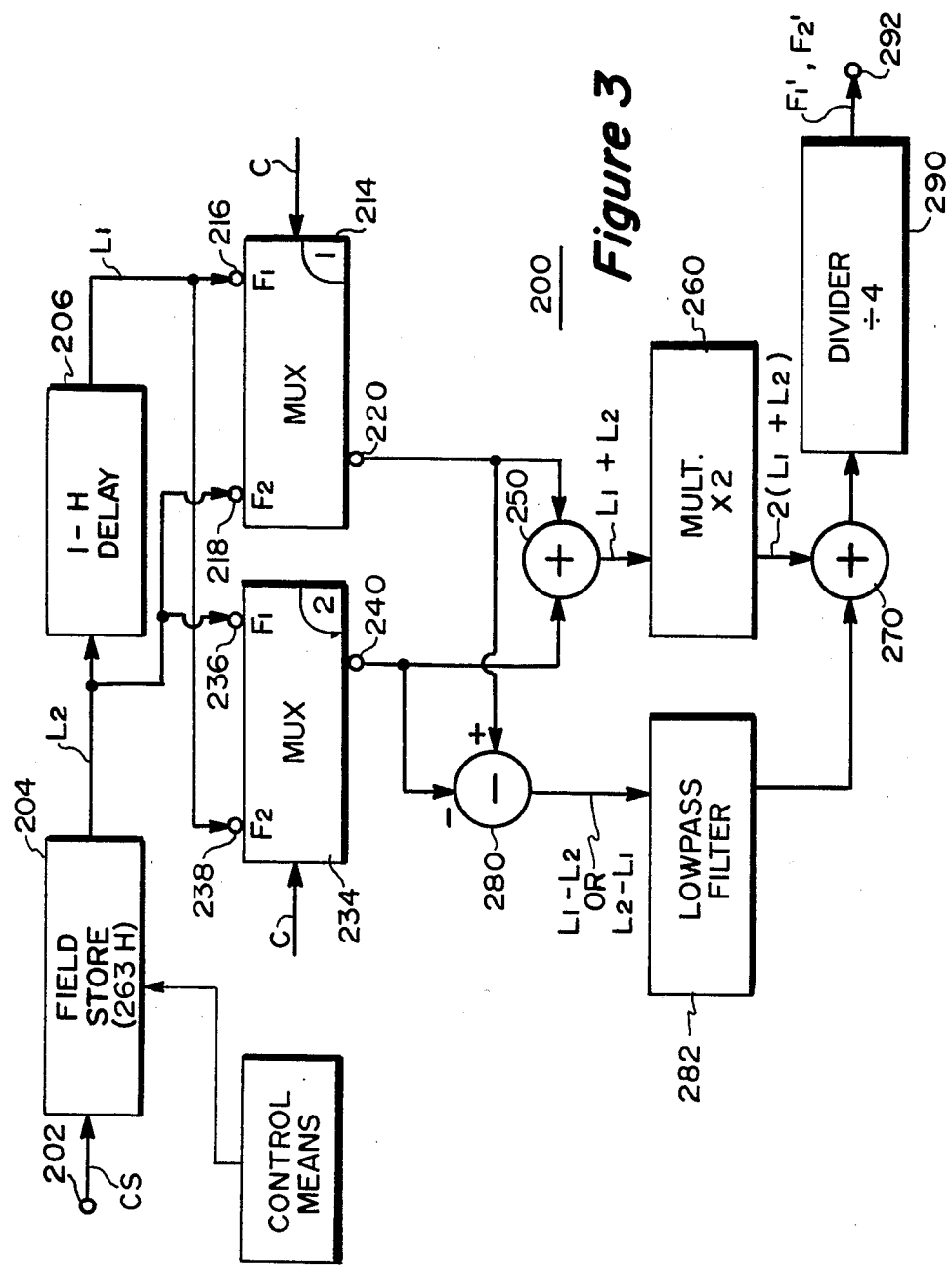

TV RECEIVER HAVING FREEZE FIELD DISPLAY

This invention relates to a television (TV) receiver having an apparatus for generating two non-identical, interlaced fields from the same field of video signal.

BACKGROUND

It is sometimes desirable to freeze the television picture. A frozen picture, for example, may be transmitted over a narrow bandwidth channel to a remote location. Or a particular moment in a sequence of action being transmitted may be frozen on the TV screen.

The basic approach taken to the production of a still picture in a TV receiver is to store either a field or a frame of video signal in a memory device. Once a field or a frame of video signal is stored, one can produce a frozen picture by stopping or inhibiting the memory writing operation and by repeatedly displaying the contents of the memory on the television screen.

The processing of the composite video signal CVS before its storage in the memory can vary in the amount of Y/C separation performed on the incoming signal. A notch filter may be used in the luminance (Y) channel of the TV receiver to remove the chrominance component therefrom. A bandpass filter may be employed in the chrominance (C) channel to remove the low frequency luminance component from the composite video signal CVS. After the composite video signal CVS is processed in this manner, the component signals CS are then stored in the respective component memories - so that they may be processed electronically to produce special effects (such as - still picture, zoom, pix-in-pix, etc).

It will be noted that the Y/C separation in the notch-filtered and bandpass-filtered video signals is incomplete or partial in the high frequency region of the video signal frequency spectrum. This is so because the luminance and chrominance components of the composite video signal CVS share the upper portion (i.e., 2.5 to 4.1 MHz) of the frequency spectrum.

Returning to the various techniques for the production of a still picture, one possible approach is the freeze frame approach. A frame of video signal can be stored in a frame memory, and read out repeatedly to generate two interlaced fields on the TV screen. The display of two interlaced fields in this manner may produce motion-induced artifacts (i.e., causes moving portions of the picture to jitter back and forth when interfield motion is present).

Another approach to the production of still pictures is to store a field of video signal in a field memory, and to display the same field of stored signal in both of the interlaced fields (i.e., produce two identical interlaced, non-interpolated or real fields). One problem with this approach is that the diagonal edges of the picture on the TV screen appear jagged. Another drawback is that the two fields have unequal spatial offsets. One field has zero offset, and the other field has a half-line offset. A half-line offset means that the signal elements are displayed on the TV screen at positions which are spaced from their true relative positions by one-half of the line spacing.

Still another approach is to display two different interlaced fields—each produced from the same stored field of video signal. The stored field is displayed as one of the two interlaced fields. The second interlaced field is generated by averaging or interpolating two adjacent lines of the stored field to produce a line that is spatially located half-way between the two lines. This approach has a number of disadvantages. The diagonal edges of the TV picture still appear somewhat jagged as in the previous approach. A further disadvantage of this approach is that the two fields may have unequal Y/C separation.

In accordance with this invention, an apparatus is disclosed for providing two non-identical fields suitable for interlaced display, and in a manner that overcomes the afore-mentioned deficiencies in the production of a freeze picture. In one embodiment of the present invention, one of the interlaced fields is generated by adding three-fourths of a line-delayed television signal $L_1$ to one-fourth of a non-delayed television signal $L_2$ (i.e., $F_1 = \frac{3}{4}L_1 + \frac{1}{4}L_2$). The other interlaced field is generated by adding one-fourth of the line-delayed television signal $L_1$ to three-fourths of the non-delayed television signal $L_2$ (i.e., $F_2 = \frac{1}{4}L_1 + \frac{3}{4}L_2$). The first and second interpolated signals $F_1$ and $F_2$ are repeatedly displayed on the TV screen during odd and even fields respectively to generate a frozen picture.

Pursuant to another embodiment of the instant invention, a frequency responsive interpolating apparatus is disclosed. For low frequency luma signal, the apparatus produces a pair of non-identical interpolated signals $F_1$ and $F_2$ as described above - by adding three-fourths of one line's amplitude to one-fourth of the adjacent line's amplitude, and vice versa. For high frequency signals (luma highs and chroma signal), however, the apparatus produces an identical line-combed output signal for both fields - i.e., $F_1 = F_2 = \frac{1}{2}L_1 + \frac{1}{2}L_2$.

IN THE DRAWINGS

FIG. 2 is a graphical representation of a raster produced on a TV screen to illustrate the operation of the FIG. 1 interpolating apparatus; and FIG. 3 illustrates a frequency responsive interpolating apparatus pursuant to another embodiment of this invention.

DETAILED DESCRIPTION

Figure 1:
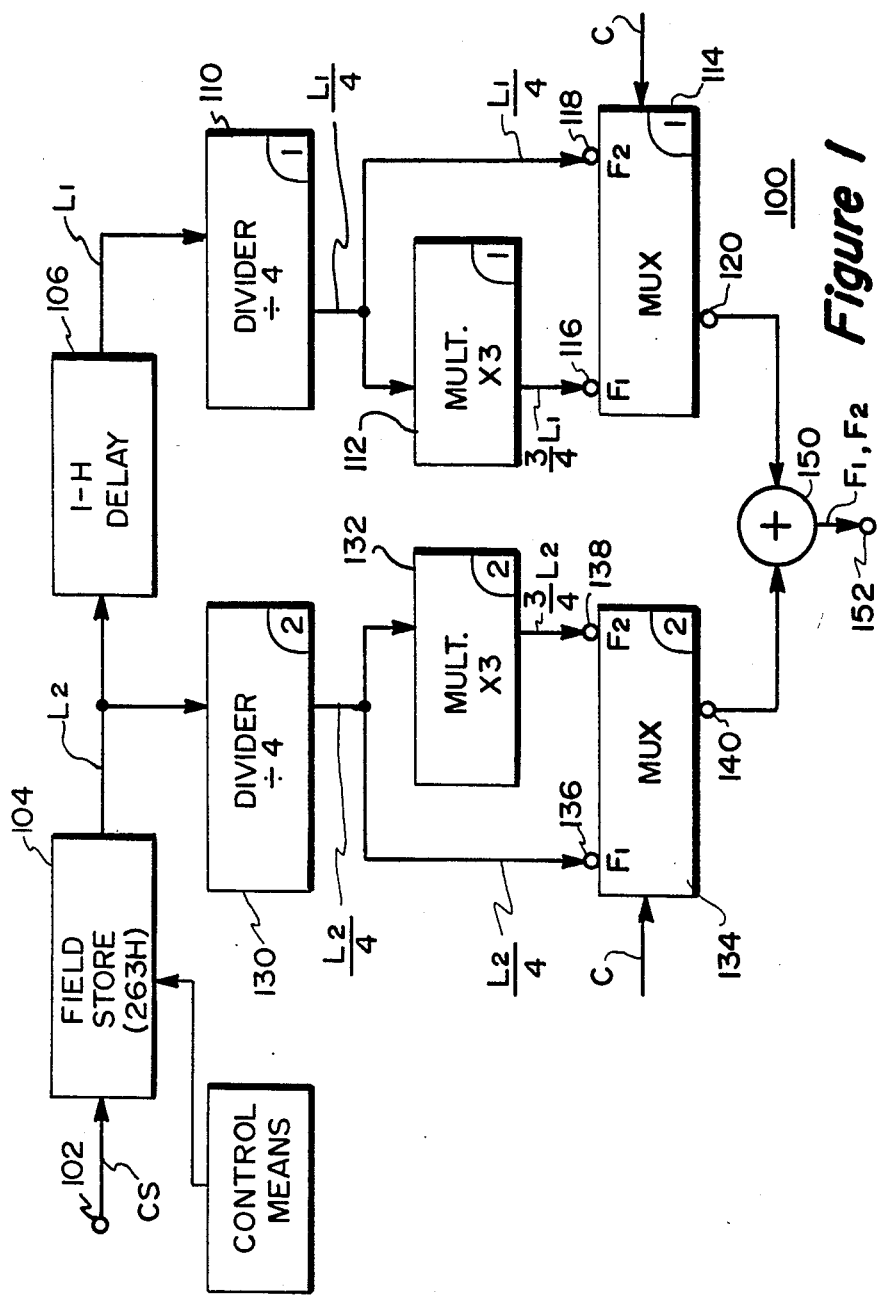
FIG. 1 shows a frequency independent interpolating apparatus for generating a pair of non-identical interlaced fields from a single stored field of video signal in accordance with one embodiment of the subject invention.

In the DRAWINGS, the lines interconnecting various blocks represent either single conductor connections carrying analog signals or multi-conductor buses carrying multi-bit parallel binary digital signals, as the case may be.

It will be readily appreciated by those skilled in the television signal processing art that the invention may be practiced on either digital or analog representations of the composite video signal. For the purposes of the detailed description, however, it will be assumed herein that the composite video signal is an 8-bit binary digital signal unless otherwise stated, and that the video signal is in the NTSC format.

It will be further assumed that the composite video signal is decoded without the use of a comb filter. A notch filter, having its center frequency located at the unmodulated color subcarrier frequency, is inserted in the luma channel to remove the chrominance component from the output signal prior to its storage in a component memory. In the similar vein, the incoming composite video signal is bandpass filtered in the chroma channel to remove the low frequency luma from the output signal, and then stored in a component memory.

In FIG. 1 freeze field apparatus 100, the luma or chroma component signal CS, present at the input port 102, is applied to a field store 104. The field store 104 is capable of storing one field (or 263 horizontal lines) of an 8-bit video signal. With the incoming video signal sampled at the rate of 4 Fsc (i.e., 4×3.58 MHz or 14.32 MHz), the field store 104 is provided with a storage capacity of about 2 M bits.

The video signal $L_2$ at the output of the field store 104 is applied to a delay element 106, which produces a line-delayed video signal $L_1$ at its output. The line-delayed video signal $L_1$ is displaced in time with respect to the incoming video signal $L_2$ by one horizontal line period (i.e., 1-H).

The line-delayed and non-delayed video signals $L_1$ and $L_2$ are applied to first and second divide-by-four circuits 110 and 130 respectively (hereinafter - dividers 110 and 130). The output of the divider 110 is coupled to a first multiply-by-three circuit 112 (hereinafter - multiplier 112), and to a second input terminal 118 of a multiplexor 114. The output of the multiplier 112 is applied to a first input terminal 116 of the multiplexor 114. The output of the multiplexor 114 is coupled to an adder 150.

The output of the second divider 130 is coupled to a second multiply-by-three circuit 132 (hereinafter -multiplier 132), and a first input terminal 136 of a second multiplexor 134. The output of the multiplier 132 is applied to a second input terminal 138 of the multiplexor 134. The output of the multiplexor 134 is coupled to the adder 150. The interpolated signals $F_1$ and $F_2$ are developed at the output terminal 152 of the adder 150.

The dividers 110 and 130 may be simple arrangements to shift the bit positions of the respective samples to two lesser significant bit positions to effect division by four.

The multiplexor 114, responsive to a control signal C, couples the first input terminal 116 to its output terminal 120 during the first one of the interlaced fields (i.e., when C is high) and couples the second input terminal 118 to its output terminal 120 during the second one of the interlaced fields (i.e., when C is low). Similarly, the multiplexor 134, responsive to the same control signal C, couples the first and second input terminals 136 and 138 thereof to its output terminal 140 during the first and second interlaced field periods respectively.

It will be seen that the adder 150 produces an output signal $F_1$ during the first interlaced field period, where $$F_1 = \tfrac{3}{4}L_1 + \tfrac{1}{4}L_2 \qquad (1)$$

During the second interlaced field period, the adder 150 produces an output signal $F_2$, where -

$$F_2 = \tfrac{1}{4}L_1 + \tfrac{3}{4}L_2 \qquad (2)$$

In the FIG. 1 apparatus, the two divide-by-four circuits 110 and 130 may be replaced by a single divide-by-four circuit coupled to the output of the adder 150.

The operation of the FIG. 1 apparatus 100 will be explained with reference to FIG. 2, which shows a television raster 160. The raster 160 is defined by a pair of interlaced fields—an odd field OF and an even field EF. The odd field OF is formed by a first plurality of horizontal scan lines—indicated by solid lines $OF/L_1$, $OF/L_2 \ldots OF/L_{263}$. The even line EF is formed by a second plurality of horizontal scan lines, which are represented by dash-dot lines—$EF/L_0$, $EF/L_1$, $EF/L_2$ ... $EF/L_{262}$. The second plurality of the horizontal scan lines are spatially disposed half-way between the respective ones of the first plurality of horizontal scan lines.

As previously indicated, the incoming video signal is sampled at the 4 Fsc rate. The successive samples of the video signal define successive picture elements or pixels. The picture elements of the odd field OF and the even field EF are respectively identified in FIG. 2 as circular and square elements.

The addition of three-fourths of the earlier line's amplitude (e.g., $\tfrac{3}{4}L_1$) to one-fourth of the next following line's amplitude (e.g., $\tfrac{1}{4}L_2$) produces successive picture elements, which are identified by triangular elements in FIG. 2. These triangular elements are located one-fourth of the way from the earlier line to the next following line. These triangular elements are displayed on the TV screen when the electron beam scans the earlier or top field—indicated as the odd field OF in the DRAWING.

The addition of one-fourth of the earlier line's amplitude (e.g., $\tfrac{1}{4}L_1$) to the three-fourths of the next following line's amplitude (e.g., $\tfrac{3}{4}L_2$) generates successive picture elements, which are identified by inverted triangular elements in FIG. 2. These inverted triangular elements are located three-fourths of the way from the earlier line or one-fourth of the way from the next following line. These triangular elements are displayed on the TV screen during the later or lower field - indicated as the even field EF in the DRAWING.

To produce a frozen picture, the incoming video signal CS is written into the field memory 104 for one full field period, the memory writing procedure is inhibited, and then the information from the field memory is read out repetitively so long as the TV receiver is in the freeze picture mode. The memory reading operation is synchronized with the horizontal and vertical deflection signals, as is well known in the art.

As can be seen from the odd field OF in FIG. 2, the start of each new vertical trace coincides with the start of a horizontal line (i.e., $OF/L_1$). Therefore, the reading of the stored field from the field memory 104 can commence immediately for the odd fields. For the even fields, however, the start of each new vertical trace occurs in the middle of a horizontal line (i.e., $EF/L_0$). The reading of the stored field must be delayed for the even fields until the beginning of the first full horizontal line in the even field (i.e., $EF/L_1$).

Thus, the even field EF is spatially located below the odd field in the TV raster produced by the aforesaid freeze field action. The operation of the memory in this manner produces 262.5 horizontal lines (i.e., $OF/L_1 \ldots OF/L_{263}$) for the odd field, and produces 262 horizontal lines (i.e., $EF/L_1 \ldots EF/L_{262}$) for the even field.

As mentioned earlier, the spatial interpolation for the odd field produces a horizontal line which is located one-fourth of the way from the earlier line (e.g., $OF/L_1$) to the next horizontal line (e.g., $OF/L_2$). This interpolated line will be displayed when the electron beam is scaning the earlier line (e.g., $OF/L_1$). Thus, a spatial offset of one-fourth of the spacing between successive horizontal lines (i.e., L/4 as shown in FIG. 2) is produced for the odd field.

The interpolated lines for the even field are located three-fourths of the way from the earlier lines (e.g., OF/L$_1$), but are displayed when the electron beam is scanning the even lines (e.g., EF/L$_1$) that fall half-way between the two lines (e.g., OF/L$_1$ and OF/L$_2$). Thus, a spatial offset of one-fourth horizontal line (L/4) is again produced for the even field. Since the spatial offsets produced by this arrangement are equal for both the odd and even fields (i.e., L/4), correct relative spatial positioning of the respective picture elements occurs.

Another advantage of this algorithm is that it produces additional Y/C separation in the output signals F1 and F2, and that the amount of the additional Y/C separation for both odd and even fields is the same. This will be seen from the following illustrative calculations for the luma channel:

$$F_1 = \tfrac{1}{2} L_1 + \tfrac{1}{2} L_2 \quad (3)$$
$$= \tfrac{1}{2}(Y + C) + \tfrac{1}{2}(Y - C)$$
$$= Y + \tfrac{1}{2} C$$

$$F_2 = \tfrac{1}{2} L_1 + \tfrac{1}{2} L_2 \quad (4)$$
$$= \tfrac{1}{2}(Y + C) + \tfrac{1}{2}(Y - C)$$
$$= Y - \tfrac{1}{2} C$$

Thus the chroma contamination in the luma channel is reduced by one-half the amplitude of the chroma signal. This means that a further Y/C separation of 6 dB occurs in the interpolated output signals F$_1$ and F$_2$ for both of the interlaced fields. The effects of the residual contamination are not as great because the polarities of the residual chroma signals alternate 180° from line to line.

In the same vein, the luma contamination in the chroma channel is reduced by 6 dB for both the odd and even fields. Again, the visual impact of the contamination is reduced because of alternating polarities on a line-to-line basis.

It is desirable to have complete Y/C separation in the output signals F$_1$ and F$_2$ in the upper portion of the frequency spectrum, where the luma highs and the chroma signal share the spectrum. In this region of the frequency spectrum, it is more important to have total Y/C separation than to have equal spatial offsets in both fields. To this end, a frequency responsive interpolating apparatus 200, shown in FIG. 3, is provided.

In the FIG. 3 apparatus 200, the component signal CS is applied to the field store 204 and the 1-H delay line 206, in the same manner as in FIG. 1. The line-delayed and non-delayed signals L$_1$ and L$_2$ are respectively coupled to the first and second input terminals 216 and 218 of a first multiplexor 214. The line-delayed and non-delayed signals L$_1$ and L$_2$ are also respectively applied to the second and first input terminals 238 and 236 of a second multiplexor 234. The multiplexors 214 and 234, responsive to the control signal C, couple their respective first and second input terminals 216, 236 and 218, 238 to the output terminals 220, 240 thereof during the first and second field periods respectively.

The outputs of the multiplexors 214 and 234 are applied to an adder 250 to generate a (L$_1$+L$_2$) signal. The output of the adder 250 is coupled to a multiply-by-two circuit 260 (hereinafter multiplier 260), which generates a 2 (L$_1$+L$_2$) signal. The output of the multiplier 260 is applied to another adder 270.

The outputs of the multiplexors 214 and 234 are further applied to the minuend and the subtrahend terminals of a subtractor 280. It will be seen that the subtractor 280 produces a first difference signal L$_1$−L$_2$ during the odd fields and a second difference signal L$_2$−L$_1$ during the even fields. The difference signals from the subtractor 280 are lowpass filtered in a filter 282 to eliminate, from its output, frequencies occupying the high frequency luma and chroma signal region (i.e., 2.5 to 4.3 MHz). The lowpass filtered difference signals are added to the 2 (L$_1$+L$_2$) signal in the adder 270.

The output of the adder 270 is applied to a divide-by-four circuit 290 (hereinafter, divider 290). The signals F$_1'$ and F$_2'$ at the output terminal 292 of the divider 290 are tabulated in the OUTPUT TABLE below:

OUTPUT TABLE

| Interlaced Field | Output Low Freq. | Output High Freq. |
|---|---|---|
| Field 1 | F$_1'$ = $\tfrac{1}{2}$ L$_1$ + $\tfrac{1}{2}$ L$_2$ | F$_1'$ = 2/4 L$_1$ + 2/4 L$_2$ = $\tfrac{1}{2}$ L$_1$ + $\tfrac{1}{2}$ L$_2$ |
| Field 2 | F$_2'$ = $\tfrac{1}{2}$ L$_1$ + $\tfrac{1}{2}$ L$_2$ | F$_2'$ = 2/4 L$_1$ + 2/4 L$_2$ = $\tfrac{1}{2}$ L$_1$ + $\tfrac{1}{2}$ L$_2$ |

The output signals F$_1'$ and F$_2'$ of the FIG. 3 apparatus 200 are the same as the output signals F$_1$ and F$_2$ of the FIG. 1 apparatus in the low frequency range of the frequency spectrum (e.g., below 2.5 MHz). In the high frequency region (e.g., 2.5 to 4.3 MHz - where the high frequency luma and chroma signals share the frequency spectrum), the output signals F$_1'$ and F$_2'$ are identical, and are the same as the signals produced by a typical line comb filter (i.e., $\tfrac{1}{2}$L$_1$+$\tfrac{1}{2}$L$_2$).

Thus, the frequency responsive apparatus 200 of FIG. 3 produces equal spatial offsets for both odd and even fields (e.g., L/4) for lower frequencies (where Y/C separation is not required). For higher frequencies (where equal spatial offset is not as critical), it comb filters the output signals (i.e., produces total Y/C separation when there is no vertical detail in the picture).

A limitation of the FIG. 3 apparatus 200 is that, for higher frequencies, the spatial offset for the odd fields is equal to one-half the line spacing (i.e., L/2), while there is zero offset for the even fields. The practical effects of this limitation are minimized because the high frequencies are interpolated one-fourth of a line below the low frequencies for the odd fields and the high frequencies are interpolated one-fourth of a line above the low frequencies for the even fields. Therefore, the effects due to unequal offsets for the high frequencies tend to cancel.

The operation of the FIG. 3 interpolating apparatus 200 is similar to that of the FIG. 1 apparatus 100. Basically, in the freeze mode, one field of video signal is stored in the field store 204. The writing process is inhibited when a full field is stored, and then the stored field is repetitively read out to generate output signals F$_1'$ and F$_2'$ during the odd and even fields respectively. The output signals are used to generate a pair of interlaced fields on the screen of a display device - such as a television receiver.

What is claimed is:

1. Apparatus for processing an incoming television signal to develop first and second interlaced field signals representing a freeze-field display, comprising:
   an input port for applying said incoming television signal;

a field store memory, coupled to said input port for storing signals representing one field interval of said incoming television signal and for providing said stored signals at an output port;

signal generating means, coupled to the output port of said field store memory and including delay means, for providing a first generated signal which is displaced in time by substantially one horizontal line period with respect to the signals provided by said field store memory and for providing a second generated signal having substantially no displacement in time with respect to the signals provided by said field store memory;

output means, coupled to said signal generating means for producing a first output signal representing a combination of said first and second generated signals in a ratio of three to one, respectively, and producing a second output signal representing a combination of said first and second generated signals in a ratio of one to three, respectively; and control means coupled to said field store memory and to said output means for selectively inhibiting said field store memory from storing said signals representing said incoming television signal, thereby conditioning said field store memory to repeatedly provide said stored signals, and for selectively conditioning said output means to alternately provide said first and second output signals as said first and second interlaced field signals, respectively, during respective alternate field periods.

2. The apparatus defined in claim 1 wherein said output means comprises:

first means coupled to said signal generating means for multiplying said first generated signal by a factor of three to produce an output signal;

first switching means having first and second input terminals respectively coupled for receiving the output signal from said first means and said first generated signal for alternately applying the output signal from said first means and said first generated signal to an output port thereof during said alternate field periods, respectively;

second means coupled to said signal generating means for multiplying said second generated signal by a factor of three to produce an output signal;

second switching means having its first and second input terminals respectively coupled for receiving said second generated signal and the output signal from said second means for respectively applying said second generated signal and the output signal from said second means to an output port thereof during said alternate field periods, respectively; and means for additively combining the outputs of said first and second switching means to alternately produce said first and second output signals during said alternate field periods, respectively.

3. The apparatus defined in claim 2 further including first normalizing means coupled to said signal generating means for dividing said first generated signal by a factor of four prior to its application to said first means for multiplying and to the second input terminal of said first switching means; and second normalizing means coupled to said signal generating means for dividing said second generated signal by a factor of four prior to its application to the first input terminal of said second switching means and to said second means for multiplying;

wherein said first and second output signals of said additively combining means are first and second normalized interlaced field signals.

4. The apparatus defined in claim 1 wherein said output means further comprises:

subtracting means coupled to receive said first and second generated signals for alternately developing a first difference signal, representing said first generated signal minus said second generated signal, and a second difference signal, representing said second generated signal minus said first generated signal, during said alternate field periods, respectively;

summing means coupled for receiving said first and second generated signals for developing a sum signal representing twice the sum of said first and second generated signals,; and adding means coupled to said subtracting means and to said summing means for combining said first and second difference signals with said sum signal to alternately generate said first and second output signals during said alternate field periods, respectively.

5. A television apparatus for processing an incoming television signal to develop first and second interlaced fields of video signal for display during respective first and second field intervals comprising:

an input source for applying said incoming television signal;

delay means coupled to said input source for generating a line-delayed television signal $L_1$ displaced in time by one horizontal line period relative to a non-delayed, incoming television signal $L_2$;

frequency responsive output means coupled for receiving said line-delayed and non-delayed television signals $L_1$ and $L_2$ for producing first and second output signals $F_1$ and $F_2$, representative of the respective one of said first and second interlaced fields, where frequency components of the output signals $F_1$ and $F_2$ are described by an output table -

OUTPUT TABLE

| Interlaced Field | Output Low Freq. | Output High Freq. |
|---|---|---|
| Field 1 | $F_1 = 3 L_1 + L_2$ | $F_1 = 2 L_1 + 2 L_2$ |
| Field 2 | $F_2 = L_1 + 3 L_2$ | $F_2 = 2 L_1 + 2 L_2$ |

6. The apparatus defined in claim 5 wherein said output means comprises:

means including subtracting means coupled for receiving said line-delayed and non-delayed television signals $L_1$ and $L_2$ for developing a first difference signal $(L_1 - L_2)$ during the first field interval, and for developing a second difference signal $(L_2 - L_1)$ during the second field interval;

a lowpass filter coupled to said means including subtracting means for eliminating the frequency components occupying the chrominance region of the frequency spectrum from said first and second difference signals and providing an output signal;

means including summing means coupled for receiving said line-delayed and non-delayed television signals $L_1$ and $L_2$ for developing at an output port thereof, a sum signal $2 L_1 + 2 L_2$ during both of the first and second field intervals; and adding means, coupled to said lowpass filter and to said means including summing means, for additively combining the output signal of the lowpass filter with said sum signal to generate said first and second output signals, $F_1$ and $F_2$, during the respective one of the first and second field intervals.

7. The apparatus defined in claim 6 further including a normalizing means, coupled to the output of said adding means, for dividing said output signals $F_1$ and $F_2$ by a factor of four (4) to generate at an output terminal first and second normalized signals, $F_1'$ and $F_2'$, during respective ones of the first and second field intervals, where -

OUTPUT TABLE

| Interlaced Field Interval | Output | |
| --- | --- | --- |
| | Low Freq. | High Freq. |
| Field 1 | $F_1' = \frac{3}{4} L_1 + \frac{1}{4} L_2$ | $F_1' = 2/4\, L_1 + 2/4\, L_2$ |
| Field 2 | $F_2' = \frac{1}{4} L_1 + \frac{3}{4} L_2$ | $F_2' = 2/4\, L_1 + 2/4\, L_2$ |

8. The apparatus defined in claim 6 wherein said means including subtracting means further includes:

first switching means, having its first and second input terminals respectively coupled for receiving said line-delayed television signal $L_1$ and said non-delayed television signal $L_2$, for applying to an output port thereof said line-delayed signal and said non-delayed signal during the first and second field intervals, respectively;

second switching means, having first and second input terminals respectively coupled for receiving said non-delayed television signal $L_2$ and said line-delayed television signal $L_1$, for applying to an output port thereof said non-delayed signal and said line-delayed signal during said first and second field intervals, respectively; and a subtracter having its minuend input terminal coupled to the output port of said first switching means and having its subtrahend input terminal coupled to the output port of said second switching means for producing said difference signals at the output thereof during respective ones of said first and second field intervals.

9. The apparatus defined in claim 6 wherein said means including summing means comprises:

an adder, having its input terminal coupled for receiving said line-delayed and non-delayed television signals $L_1$ and $L_2$, for producing at an output terminal thereof an output signal, $L_1 + L_2$; and a multiplier coupled to said adder for multiplying the output signal produced by said adder by a factor of two (2).

* * * * *

Disclaimer 4,761,686.—*Donald H. Willis*, Indianapolis, Ind. TV RECEIVER HAVING FREEZE FIELD DISPLAY. Patent dated Aug. 2, 1988. Disclaimer filed July 21, 1989, by the assignee, RCA Licensing Corp.

Hereby enters this disclaimer to claim 1 of said patent.

[*Official Gazette October 31,1989*]